May 19, 1925.

A. W. SAGER

GRAIN SEPARATOR

Filed Oct. 24, 1923

1,538,660

Inventor
Arthur W. Sager,
By
Attorney

Patented May 19, 1925.

1,538,660

UNITED STATES PATENT OFFICE.

ARTHUR W. SAGER, OF HORICON, WISCONSIN.

GRAIN SEPARATOR.

Application filed October 24, 1923. Serial No. 670,545.

*To all whom it may concern:*

Be it known that ARTHUR W. SAGER, a citizen of the United States of America, residing at Horicon, in the county of Dodge and State of Wisconsin, has invented new and useful Improvements in Grain Separators, of which the following is a specification.

The purpose of the invention is to provide a device adapted particularly for the separation of wild oats from tame oats or other small grain, and to make such device of simple construction and efficient in operation, comprising few parts which may be easily and cheaply manufactured and assembled.

With this purpose in view the invention consists in a construction and combination of parts of which a preferred embodiment is shown in the accompanying drawings, wherein:—

Figure 1:
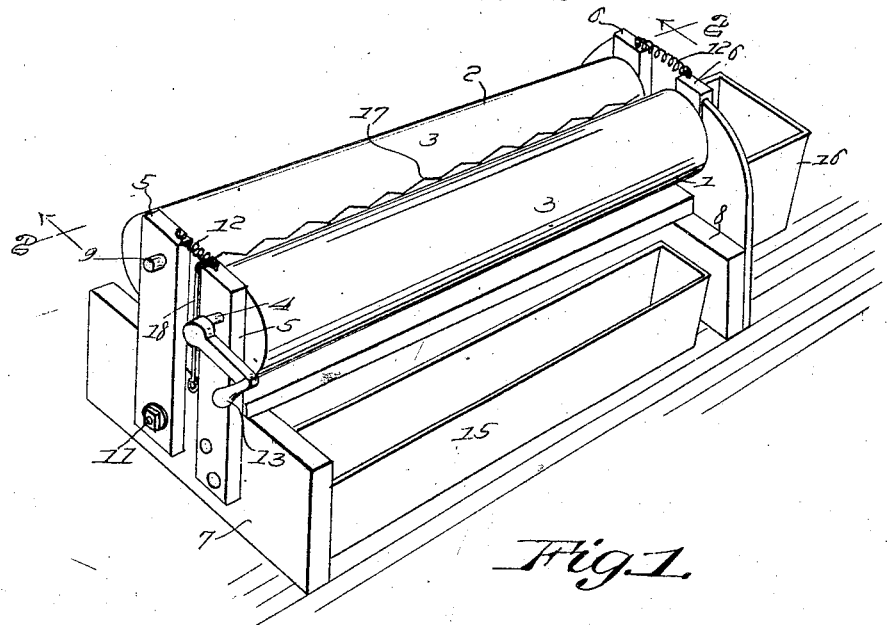
Figure 1 is a perspective view of the invention.
Figure 2:
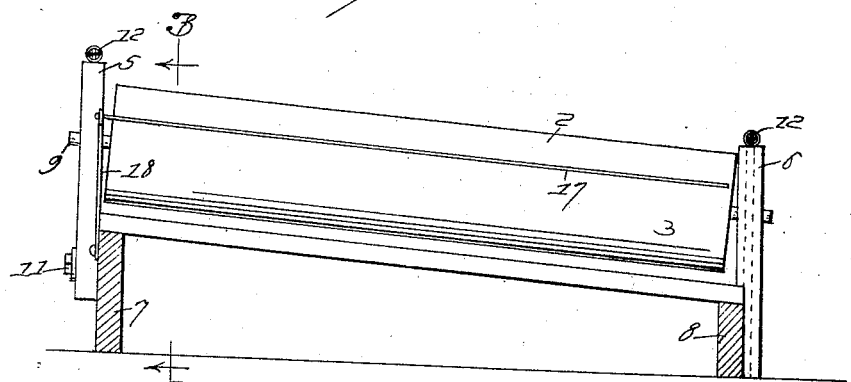
Figure 2 is a longitudinal sectional view on the line 2—2 of Figure 1.
Figure 3:
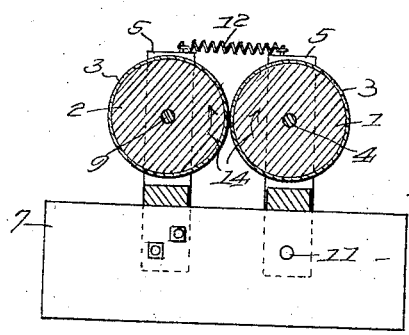
Figure 3 is a section on the line 3—3 of Figure 2.

The invention comprises the complemental rollers 1 and 2 provided with a peripheral covering 3 which is preferably a skin with the flesh face against the rollers and the hide face exposed with the fur clipped short. The roller 1 is carried by a shaft 4 journaled in the uprights 5 and 6 of which the former is supported at the lower end by a transverse base bar 7 and the latter by a transverse base bar 8 which is lower than the base bar 7, so as to incline the shaft 4 and its roller 1. The companion or complemental roller 2 is designed for lateral yielding movement with respect to the roller 1 and to this end is carried on a shaft 9 journaled in upright arms 10, pivoted as at 11 to the base bars 7 and 8, springs 12 being terminally secured to the upper ends of the arms 10 and uprights 4 and 6 and drawing the roller 2 laterally into contact with the roller 1. The roller 1 is rotated by means of a crank handle 13 connected with one of the shaft terminals and frictional contact between the two rollers results in the rotation of both upon angular movements being imparted to the crank handle. The grain is deposited on the two rollers adjacent the extremities above the base bar 7 and the rollers being disposed in inclined planes, the tendency of the grain is to travel toward the lower ends of the rollers, the rollers in operation being rotated as indicated by the arrows 14 in Figure 1. The fur covering of the rollers is designed to engage the wild oats in the turning operation and these are thus carried from the channel or trough provided by the contacting peripheral surfaces of the rollers and deposited in suitable receptacles at the outer sides of the rollers, as indicated at 15 in Figure 1, the tame oats continuing down the trough or channel provided by the two rollers and passing into a receiving receptacle 16 as indicated in Figure 1.

In order to turn the kernels of grain to keep them from disposition longitudinally in the trough or hopper provided by the two rollers, a turning element 17 is provided and consists of a serpentine or zig zag wire disposed above the contacting peripheral surfaces of the two rollers and terminally connected with upright supports or arms 18. The function of this wire is to engage the kernels and dispose them with their lengths in the direction of the circumference of the rollers so that the wild oats may be carried over by the fur covering of the rollers and the tame oats worked down by the continual rotation of the rollers and the inclination of the same to the discharge mouth at the lower extremities of the rollers.

Having described the invention, what is claimed as new and useful is:—

A device for the purpose indicated comprising cooperating complemental rollers in peripheral contact and disposed at an inclination to provide a downwardly inclined trough above the points of peripheral contact, means for rotating the rollers, and means for disposing grain kernels transversely of the rollers and consisting of a zig zag or serpentine wire supported above the points of peripheral contact within the rollers.

In testimony whereof he affixes his signature.

ARTHUR W. SAGER.